US007419379B2

(12) United States Patent
Wu et al.

(10) Patent No.: US 7,419,379 B2
(45) Date of Patent: Sep. 2, 2008

(54) COMPUTER SYSTEM AND INTERFACE CARD MODULE THEREOF

(75) Inventors: Chih-Peng Wu, Taipei (TW); Yu-Liang Liu, Taipei (TW); Pang-Wei Shih, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 11/495,615

(22) Filed: Jul. 31, 2006

(65) Prior Publication Data
US 2007/0028126 A1    Feb. 1, 2007

(30) Foreign Application Priority Data
Jul. 29, 2005    (TW)    ............... 94125926 A

(51) Int. Cl.
*H01R 12/00*    (2006.01)
(52) U.S. Cl. ....................................... 439/65
(58) Field of Classification Search .................. 439/65, 439/61–62, 493, 74, 637–638; 361/752, 361/690, 784, 789, 792
See application file for complete search history.

(56) References Cited
U.S. PATENT DOCUMENTS 5,656,869 A * 8/1997 Gluskoter et al. ............. 307/64
6,129,598 A * 10/2000 Yu et al. ....................... 439/883
6,175,406 B1 * 1/2001 Iizuka et al. ................... 355/75
6,997,720 B2 * 2/2006 Perret et al. ................... 439/67
7,014,472 B2 * 3/2006 Fjelstad et al. ................ 439/65
7,044,801 B2 * 5/2006 Park ............................ 439/638
7,158,379 B2 * 1/2007 Sanders et al. .............. 361/703
7,168,961 B2 * 1/2007 Hsieh ........................... 439/74
7,254,038 B2 * 8/2007 Drako ......................... 361/752
2004/0172492 A1 * 9/2004 Farnworth et al. .......... 710/300

FOREIGN PATENT DOCUMENTS

| CN | 2610381 Y | 4/2004 |
| CN | 1635450 A | 7/2005 |
| TW | 467314 | 12/2001 |
| TW | 1233013 | 5/2005 |

* cited by examiner

*Primary Examiner*—Jean F Duverne
(74) *Attorney, Agent, or Firm*—Rabin & Berdo, PC

(57) ABSTRACT

An interface card module applied in a computer system is provided. The interface card module includes an interface card and an adapter. The interface card includes at least one interface card connector disposed on a first side of the interface card. The first side is fastened on a case of the computer system. The adapter is electrically connected to the interface card connector. The adapter provides a first power for driving the interface card and providing partial or entire power consumed by the interface card.

12 Claims, 4 Drawing Sheets

COMPUTER SYSTEM AND INTERFACE CARD MODULE THEREOF

This application claims the benefit of Taiwan application Serial No. 94125926, filed Jul. 29, 2005, the subject matter of which is incorporated herein by reference.

BACKGROUND OF THE INVENTION

1. Field of the Invention

The invention relates in general to an interface card module, and more particularly to an interface card module of a computer system.

2. Description of the Related Art

With the continual updating of computer add-on-cards such as display cards, sound cards, and network interface cards are upgraded to provide the consumers with interface cards having more versatile and more powerful functions and faster computing speed, so that the consumers can enjoy faster and more wonderful audio and visual experience with the computer. The connection between an interface card and its peripheral power device are disclosed below.

Referring to FIG. 1, a block diagram of an interface card and its power device is shown. The computer system 100 includes a motherboard 101, an interface card 103 and a power supply 105. The motherboard 101 has an interface card slot 102 disposed thereon. The interface card 103 is inserted into the interface card slot 102 through which the power is transmitted to the interface card 103 for processing operations. The interface card slot 102 may be provided with different kinds of the interface specification such as the PCI interface specification, the PCI-EXPRESS interface specification and the AGP interface specification. The interface card slot 102 of various interface specifications can provide differs power. For example, the PCI interface, the AGP interface and the PCI-EXPRESS can provide 56 Watts, 42 Watts and 75 Watts of the maximum power, respectively. Presuming the user needs to insert a new model interface card 103, which requires 150 Watts, but the PCI-EXPRESS interface card slot 102 can provide 75 Watts only. In other words, in order to drive the new model interface card 103, another 75 Watts are required. The current practice to resolve the above problem is connecting the power supply 105 to the interface card 103 for providing the additional 75 Watts. The dotted line in FIG. 1 illustrates the power line connecting the power supply 105 to the interface card 103.

However, the interface cards are continually upgraded. Particularly, the large-scaled display devices may need to have higher resolution or the display cards may need to have faster operating speed as required by computer games, therefore a single display card or multiple display cards may be disposed on the motherboard to provide more power functions and faster operating speed. Thus, the power consumed by the interface card and various circuit components of the motherboard may exceed the maximum load of the power supply. The user needs to exchange a power supply capable of providing sufficient power.

In terms of the user, whenever an interface card is replaced or augmented, the power supply needs to be replaced at the same time. It is indeed very troublesome to replace the power supply and reset the circuits of other electronic devices, and the associated cost would increase significantly. Not only will the consumers have to tackle the extra troubles, but the disposal of the usable existing power supply is actually a waste of resources.

SUMMARY OF THE INVENTION

It is therefore an object of the invention to provide a computer system and an interface card module thereof for enabling the user not to worry about whether the existing power supply has sufficient power or not after the interface card module is replaced. There is no need to install an additional powerful power supply to meet the requirement of power consumption.

The invention achieves the above-identified object by providing a computer system and an interface card module. The computer system incorporates an external power to decrease system load. The computer system includes a case, a motherboard, a power supply and an interface card module. The case has at least one opening, and the motherboard is fastened on the case. The motherboard has at least one interface card slot. The power supply is also fastened on the case. The power supply is electrically connected to the motherboard. The interface card module includes an interface card and an adapter. The interface card is inserted into the interface card slot of the computer system. The adapter is electrically connected to the interface card. The adapter is able to be connected to an external power for providing a first power to the interface card. The power supply provides a second power to the interface card slot. The interface card can be driven by the first power and the second power or by the first power alone.

The invention further achieves the above-identified object by providing a computer system including a case, a motherboard, a power supply and an interface card module. The case has at least one opening.

The motherboard is fastened on the case and has at least one interface card slot. The power supply also fastened on the case is electrically connected to the motherboard. The interface card module includes an interface card and an adapter. The interface card includes at least one interface card connector disposed on a first side of interface card. The first side is fastened on the case. A second side of the interface card is inserted into the interface card slot. The adapter electrically connected to the interface card is able to be connected to an external power for providing a first power. With the first power being provided by the adapter and the second power being provided to the interface card slot by the power supply, the interface card can be driven by the first power and the second power. The interface card can also be designed to be driven by the first power alone to decrease the load of the power supply providing the second power according to the demand of design.

The invention further achieves the above-identified object by providing yet another interface card module applied in a computer system. The interface card module includes an interface card and an adapter. The interface card includes at least one interface card connector disposed on a first side of interface card. The first side is fastened on a case of the computer system. When the adapter is electrically connected to interface card connector, the adapter is able to be connected to an external power to provide a first power for driving the interface card and providing partial or entire power consumed by the interface card.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
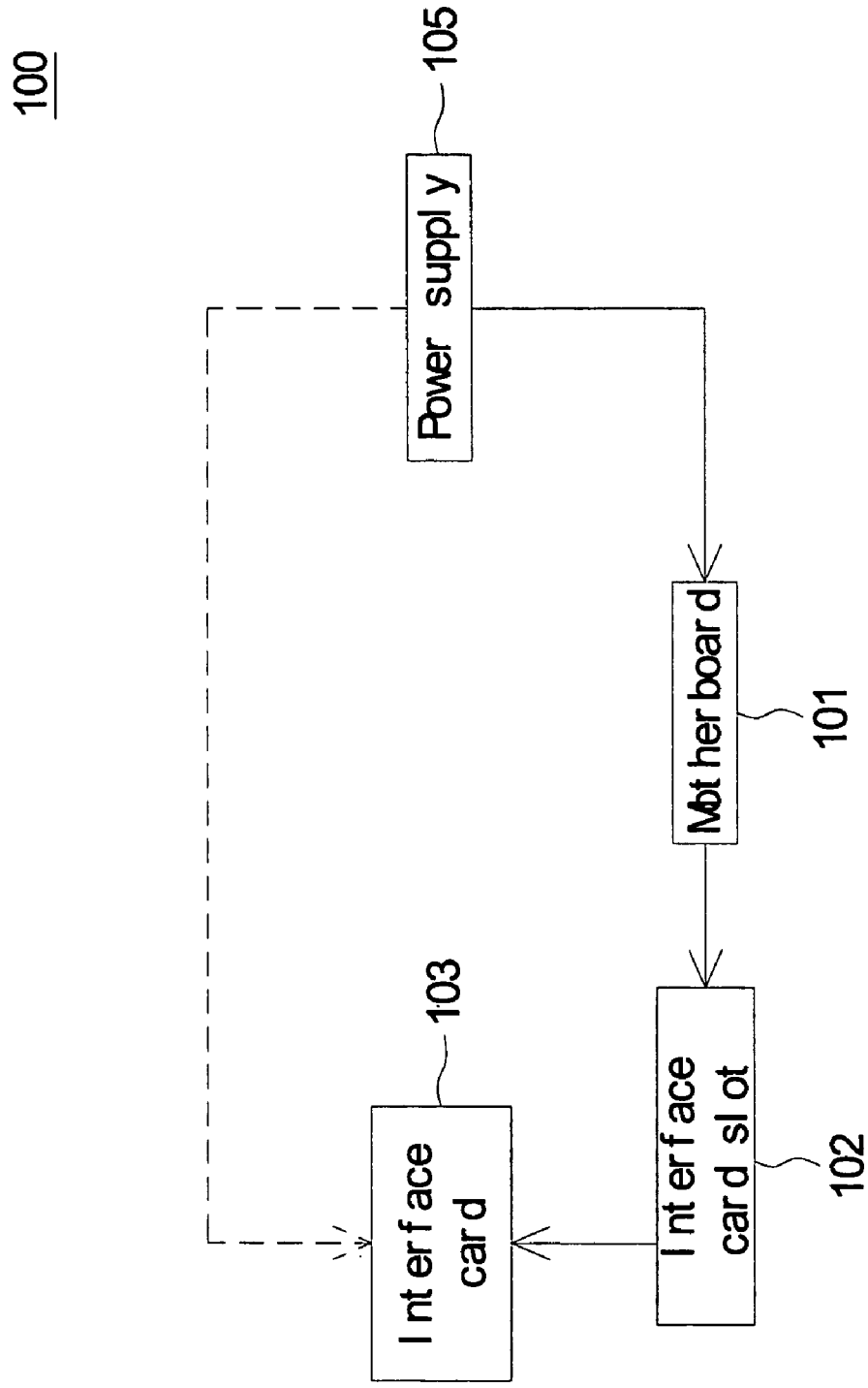
FIG. 1 (Prior Art) is a block diagram of an interface card and its power device.
Figure 2A:
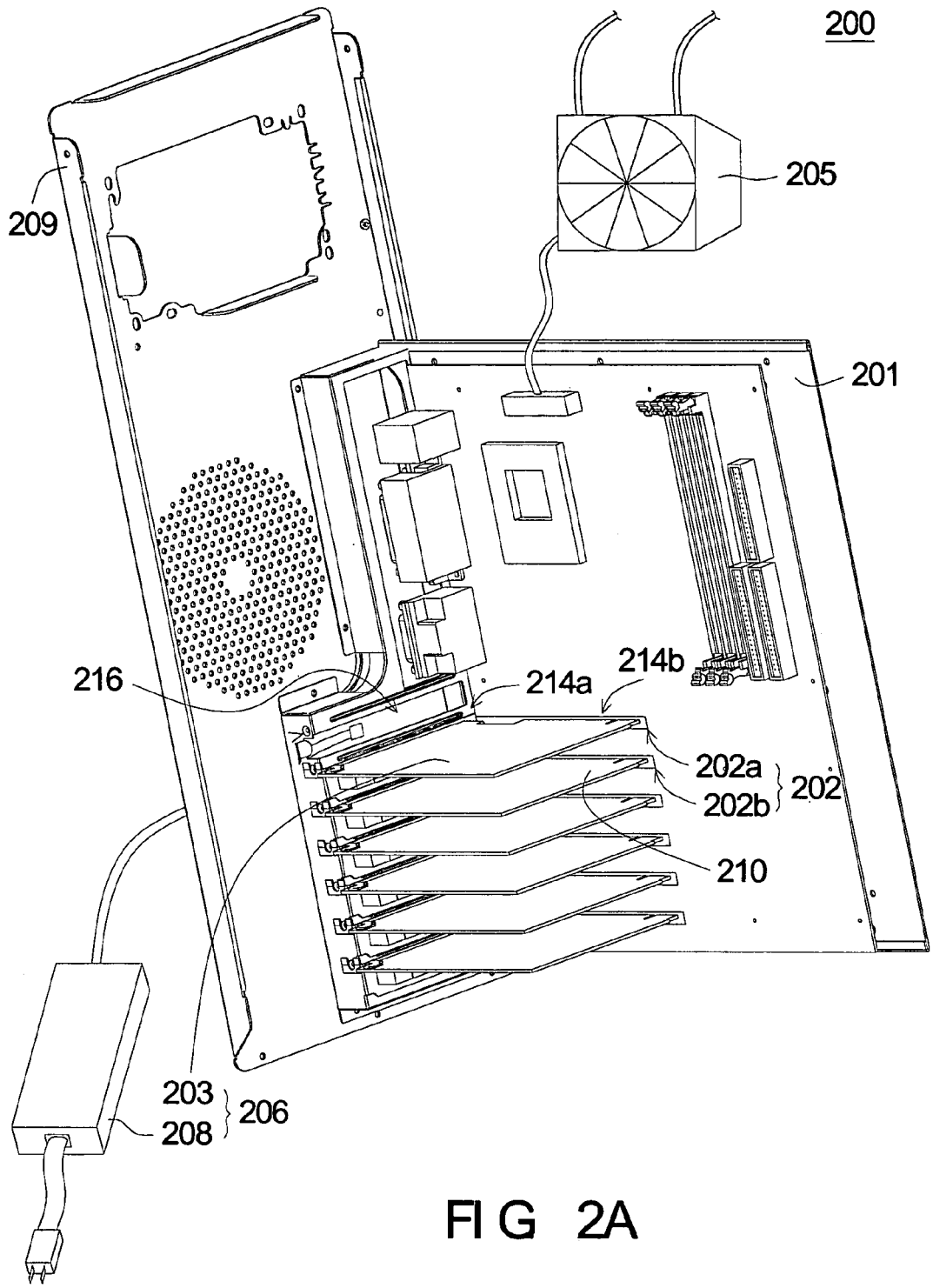
FIG. 2A is a diagram of a computer system.

Referring to FIG. 2A, is a diagram of a computer system is shown. The computer system 200 includes a case 209, a motherboard 201, a power supply 205 and an interface card module 206. The interface card module 206 includes at least one interface card 203 and an adapter 208. The adapter 208 is able to be connected to an external power. The motherboard 201 is fastened on the case 209. The power supply 205 is electrically connected to the motherboard 201. A first side 214a of the interface card 203 is fixed on an opening of the case 209. Examples of the opening include an opening 216. The motherboard 201 has at least one interface card slot 202. A second side 214b of the interface card 203 is inserted into the interface card slot 202. Examples of the interface card slot 202 include an interface card slot 202a and an interface card slot 202b. Various slots are for receiving interface card 203 and interface card 210, respectively. The interface card 203 can be a display card, while the interface card 210 can be a display card, a sound card, a TV-TUNER card, a network interface card or a graphics accelerator card. The interface card slot 202 can be a PCI interface slot, a PCI-EXPRESS interface slot or an AGP interface specification.

Figure 2B:
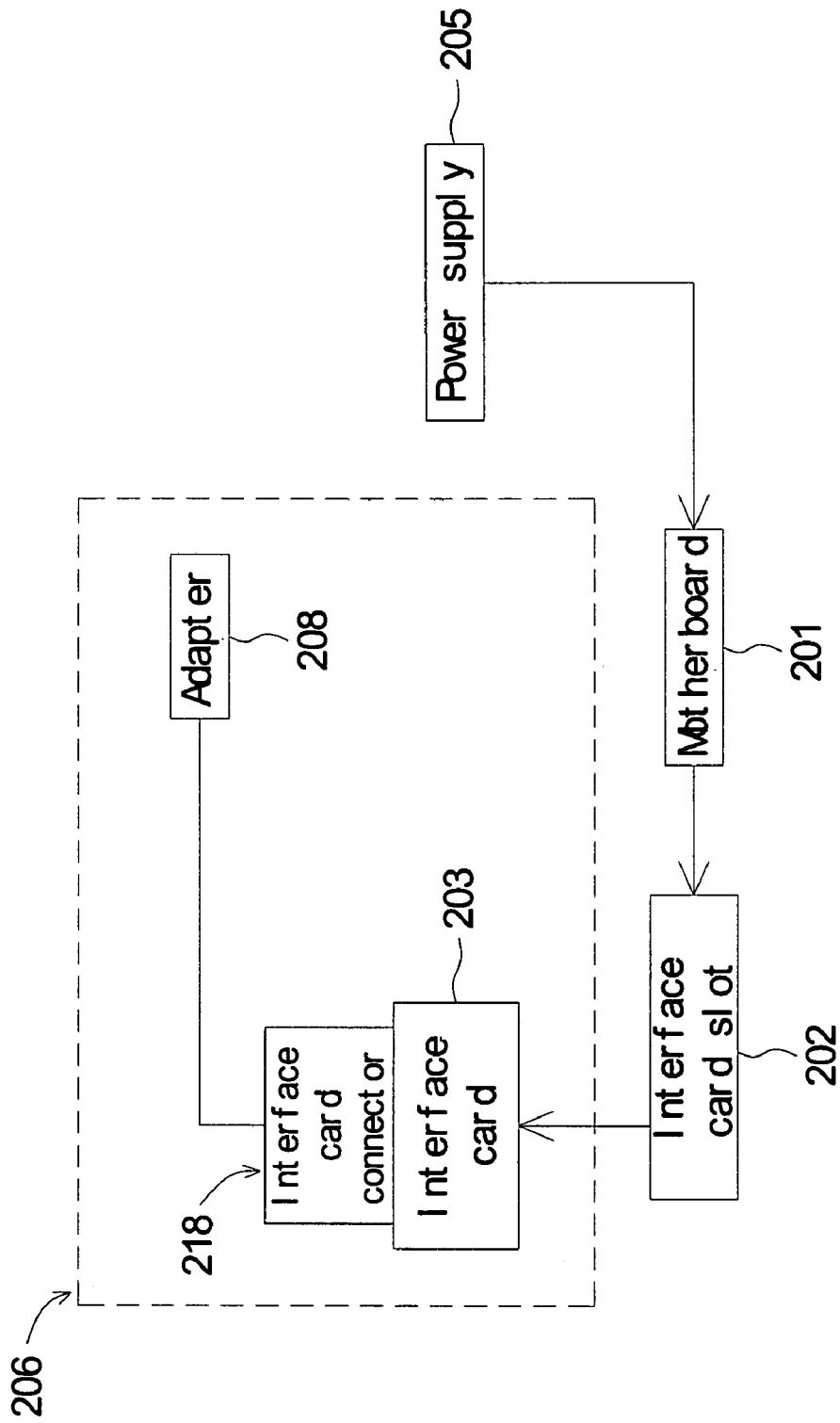
FIG. 2B is a block diagram of interface card and its power device.

Referring to both FIG. 2A and FIG. 2B. FIG. 2B is a block diagram of interface card and its power device. In order to drive the interface card 203, the interface card connector 218 disposed on the first side 214a of the interface card 203 is electrically connected to the adapter 208 for providing a first power, and the power supply 205 is electrically connected to the interface card slot 202 via the motherboard 201 for providing the second power. The first power and the second power are provided to the interface card 203 for driving the interface card. Presuming 150 Watts are required to drive the interface card 203, but the maximum power that the PCI interface, the PCI-EXPRESS interface and the AGP interface can provide are 56 Watts, 75 Watts and 42 Watts, respectively. Take the PCI-EXPRESS interface for example, another 75 Watts are required to drive the interface card 203. The additional 75 Watts are provided through the adapter 208. If the interface card 203 is inserted into the AGP interface slot, then additional 108 Watts are required. Therefore, the interface card slot 202 is preferably of the PCI-EXPRESS interface specification, so that the voltage load of the adapter 208 can be decreased. Alternatively, a 150 Watt adapter 208 can provide necessary power for driving the interface card 203, hence decreasing the voltage required of the power supply 205. As shown in FIG. 2A, the adapter 208 is connected to the outside of the case 209, and the first side 214a of the interface card 203 is partly exposed outside the case 209. When the user inserts the adapter 208 into the interface card 203, the user does not have to dismount the case 209, and the assembly is thus made much easier.

Figure 2C:
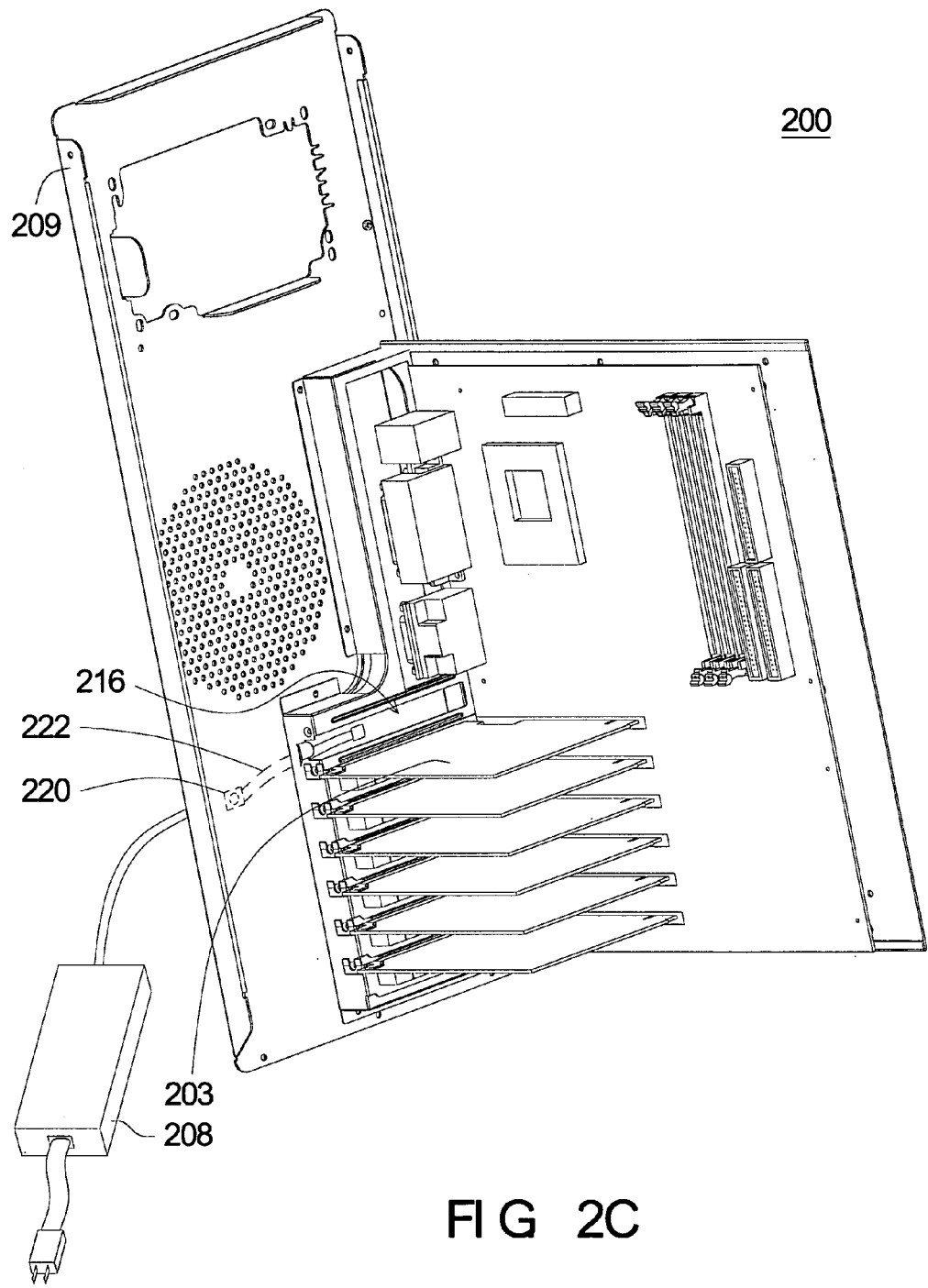
FIG. 2C is a diagram of a cable, an interface card and an adapter.

However, there are a large variety of connectors. If the adapter 208 is directly connected to the interface card but the connector connected to the adapter is not the right one, then a cable can be further added to the connector to resolve the problem. Referring to FIG. 2C, a diagram of a cable, an interface card and an adapter is shown. For various connectors corresponding to various adapters to be electrically connected to the interface card, the adapter 208 is electrically connected to the diverter 220 fastened on the case 209 first, and then the adapter 208 is electrically connected to the interface card 203 via the cable 222 of the diverter 220. By doing so, various adapters 208 can be connected to the interface card 203.

According to the computer system and the interface card module thereof disclosed in above embodiment, the adapter of the interface card module enables the interface card to have two sources of power supply. One power source comes from the power supply and the other power source is through the adapter connected to an external power. With the assistance of the adapter, despite the interface card requires a higher power voltage, the user still does not need to increase the voltage of the power supply to drive the high voltage consumption interface card by replacing the existing power supply. If the existing interface card is replaced by a new interface card, the user can always find an adapter that goes with the new interface card, which is indeed very convenient to the user.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system equipped with an external power for alleviating system load, comprising:
    a case having at least one opening;
    a motherboard fastened on the case, wherein the motherboard has at least one interface card slot;
    a power supply fastened on the case, wherein the power supply is electrically connected to the motherboard; and
    an interface card module, comprising:
        an interface card inserted into the interface card slot and equipped with at least one interface card connector;
        an adapter connected to the interface card connector to be electrically connected to the interface card, wherein the adapter is connected to the external power for providing a first power to the interface card;
        at least one cable; and
        at least one diverter, wherein one end of the cable is electrically connected to the interface card connector, while the other end of the cable is electrically connected to the diverter disposed on the case and exposed from the opening of the case, the adapter can be connected to the diverter to be electrically connected to the interface card;
    wherein the power supply provides a second power to the interface card slot, the interface card is driven by the first power and the second power or by the first power alone.

2. The computer system according to claim 1, wherein the interface card connector is disposed on a first side of the interface card, the first side is fastened on the case for the interface card connector to be exposed from the opening.

3. The computer system according to claim 1, wherein the interface card slot is a PCI interface.

4. The computer system according to claim 1, wherein the interface card slot is a PCI-EXPRESS interface.

5. The computer system according to claim 1, wherein the interface card slot is an AGP interface.

6. The computer system according to claim 1, wherein the interface card is selected from one of a display card, a network interface card, a TV-TUNER card, a sound card and a graphics accelerator card.

7. The interface card module according to claim 6, wherein the interface card is selected from one of a display card, a network interface card, a TV-TUNER card, a sound card and a graphics accelerator card.

8. An interface card module applied in a computer system and equipped with an external power for alleviating system load, wherein the computer system has a motherboard, the interface card module comprises:

an interface card inserted into an interface card slot of the motherboard and equipped with at least one interface card connector;

an adapter connected to the interface card connector to be electrically connected to the interface card, wherein the adapter is connected to the external power for providing a first power to drive the interface card;

at least one cable; and at least one diverter, wherein one end of the cable is electrically connected to the interface card connector, while the other end of the cable is electrically connected to the diverter disposed on the case and exposed from the opening of the case, the adapter can be connected to the diverter to be electrically connected to the interface card.

9. The interface card module according to claim 8, wherein the interface card connector is disposed on a first side of the interface card, the first side is fastened on a case of the computer system, the case has an opening for exposing the interface card connector.

10. The interface card module according to claim 8, wherein the interface card slot is a PCI interface.

11. The interface card module according to claim 8, wherein the interface card slot is a PCI-EXPRESS interface.

12. The interface card module according to claim 8, wherein the interface card slot is an AGP interface.

* * * * *